United States Patent [19]

Strange et al.

[11] Patent Number: 4,477,657

[45] Date of Patent: Oct. 16, 1984

[54] PROCESS FOR PREPARING HYDROXYALKYLCELLULOSE ETHERS

[75] Inventors: Carl P. Strange, Walker; Christopher D. Messelt, Baton Rouge, both of La.; Clark W. Gibson, Bainbridge, Ga.

[73] Assignee: The Dow Chemical Company, Midland, Mich.

[21] Appl. No.: 512,086

[22] Filed: Jul. 8, 1983

[51] Int. Cl.³ .................. C08B 11/08; C08B 11/193
[52] U.S. Cl. ................................ 536/91; 536/90; 536/95
[58] Field of Search ............... 536/91, 84, 90, 95, 536/96

[56] References Cited

U.S. PATENT DOCUMENTS

| | | | |
|---|---|---|---|
| 2,831,852 | 4/1958 | Savage | 536/91 |
| 2,835,666 | 5/1958 | Savage | 536/91 |
| 3,131,176 | 4/1964 | Klug | 536/96 |
| 3,388,082 | 6/1968 | Rodgers et al. | 524/43 |
| 3,709,876 | 1/1973 | Glomski et al. | 536/91 |
| 3,839,319 | 10/1974 | Greminger et al. | 536/91 |
| 3,873,518 | 3/1975 | Strange et al. | 536/91 |
| 4,096,325 | 6/1978 | Teng et al. | 536/91 |

FOREIGN PATENT DOCUMENTS

| | | | |
|---|---|---|---|
| 49-17878 | 2/1974 | Japan | 536/95 |
| 56-802 | 1/1981 | Japan | 536/95 |
| 973952 | 11/1964 | United Kingdom | 536/91 |

*Primary Examiner*—Ronald W. Griffin

[57] ABSTRACT

Higher reaction efficiencies are seen in cellulose etherification reactions when the reagents are continuously added to alkali cellulose at elevated temperatures. In particular, mixed hydroxyalkylcellulose ethers are prepared with higher reaction efficiencies using this process. In an especially preferred embodiment, hydroxypropylmethylcellulose is prepared by continuously adding propylene oxide to heated cellulose containing a small amount of caustic, adding more caustic and then continuously adding methyl chloride at elevated temperatures.

13 Claims, No Drawings

PROCESS FOR PREPARING HYDROXYALKYLCELLULOSE ETHERS

BACKGROUND OF THE INVENTION

This invention relates to a process for the preparation of hydroxyalkylalkylcellulose ethers, more particularly to hydroxyalkylalkylcellulose ethers having $C_3$ or higher hydroxyalkoxyl functionalities.

Hydroxyalkylalkylcellulose ethers (HAAC) having $C_3$ or higher hydroxyalkoxyl functionalities are conventionally prepared by reacting alkali cellulose with a $C_3$ or higher alkylene oxide and an etherifying agent which is not an alkylene oxide such as an alkyl chloride, dialkyl sulfate or halocarboxylic acid. In such conventional processes, the alkylene oxide (AO) and the etherifying agent are charged into a reaction vessel containing this alkali cellulose and the reaction mass allowed to react at elevated temperatures until the desired substitution on the cellulose molecule is obtained.

Unfortunately, however, AO undergoes various reactions under the conditions of conventional cellulose etherification reactions. For example, a molecule of AO can react with a molecule of water and a second AO molecule to form a glycol ether. The AO can also react with the etherifying agent to form ethers therewith. Such side reactions are undesirable because impurities are generated which must be removed from the product, and the overall efficiency of the etherification reaction is drastically reduced. For example, in a typical reaction of alkali cellulose with propylene and methylene chloride under conventional conditions, only about 10 to 25 weight percent of the propylene oxide employed reacts with the alkali cellulose as desired.

It has been attempted to reduce the aforementioned side reactions of AO by carrying out the preparation of HAAC in stages. In such processes, the AO is reacted with the cellulose in the presence of only a small amount of an alkali. Following this reaction, additional alkali is added and the alkylation reaction is run. While such processes have increased efficiency of the AO/alkali cellulose reaction, still higher efficiencies would be desirable.

Accordingly, a process for preparing mixed hydroxyalkylcellulose wherein the efficiency of the AO reaction is increased would be highly desired.

SUMMARY OF THE INVENTION

The present invention is such a desirable process. The process comprises the steps of (a) forming a reaction mass comprising cellulose and an amount of an alkali metal hydroxide at least sufficient to break up the crystallinity of the cellulose and to catalyze the reaction between cellulose and an alkylene oxide and (b) continuously adding a $C_3$ or higher alkylene oxide and an etherifying agent other than an alkylene oxide to the reaction mass under conditions including an elevated temperature such that the alkylene oxide and the etherifying agent react with the cellulose to attach ether groups thereto.

An especially preferred embodiment of this invention comprises the steps of (a) forming a reaction mass comprising cellulose pulp and an amount of an alkali metal hydroxide not substantially in excess of that amount required to break up the crystallinity of the cellulose, then (b) continuously adding to the reaction mass a $C_3$ or higher alkylene oxide under conditions including an elevated temperature such that a desired amount of hydroxyalkoxyl groups become attached to the cellulose, then (c) adding an incremental amount of an alkali metal hydroxide to the reaction mass and then (d) continuously adding an etherifying agent which is not an alkylene oxide to the reaction mass under conditions including an elevated temperature such that a desired amount of ether groups become attached to the cellulose molecule.

Surprisingly, the AO efficiency of the process of this invention is significantly improved compared to conventional processes. Using the preferred process of this invention, AO efficiencies in the range from 40 to 70 percent or higher are often seen. A further advantage of the process of this invention is that this process generally requires less reaction time than conventional processes.

DETAILED DESCRIPTION OF THE INVENTION

The central point of this invention is the continuous addition of alkylene oxide and etherifying agent to a reaction mass comprising cellulose and an aqueous alkali metal hydroxide solution. In this invention, the alkylene oxide and etherifying agent are each added to the reaction mass continuously over a period of time. Said addition is made under conditions such that the alkylene oxide and etherifying agent react with the reaction mass to attach ether groups to the cellulose. The alkylene oxide is advantageously and preferably added to the reaction mass before the addition of the etherifying agent.

The process of this invention is preferably, but not necessarily, carried out in stages, with a first hydroxyalkylation reaction being performed in the presence of relatively small amounts of the alkali metal hydroxide and, after the hydroxyalkylation reaction, additional alkali metal hydroxide is added and the etherification reaction is run.

Cellulose such as is commercially available, particularly cellulose derived from wood, oat hulls or cotton is employed herein as a raw material. In order to carry out the etherification reactions of cellulose, the cellulose is thoroughly mixed with a concentrated aqueous alkali metal hydroxide solution (hereinafter "caustic solution"). The caustic solution is preferably a sodium hydroxide solution containing at least 20, preferably at least 40, more preferably at least about 50, weight percent sodium hydroxide. The caustic solution performs a three-fold function in the etherification reaction: it catalyzes the alkylene oxide/cellulose reaction; it reacts with cellulose and the etherifying agent to attach ether groups to the cellulose; and it breaks up the crystalline structure of the cellulose.

When a one-stage reaction is run, sufficient caustic solution is added to the cellulose at the outset to fulfill all of the aforementioned functions. In a two-stage reaction, however, the amount of caustic employed at the outset is advantageously not substantially higher than required to break up the crystalline structure of the cellulose. Failure to break up said crystallinity results in a product containing significant quantities of fibers and other insoluble materials as well as irregular substitution. The fiber content of the product therefore depends on the amount of caustic employed at the outset of the reaction. When lower fiber contents are desired, slightly higher caustic levels are advantageously employed in the first stage of the reaction. Typically, in a two-staged reaction, from about 0.1 to about 0.8, preferably 0.15 to about 0.5, part of caustic is employed per part by weight cellulose in the first stage. An excess amount of caustic tends to reduce the efficiency of the AO reaction and is therefore avoided. In the second stage of the two-stage reaction, sufficient additional caustic is added to obtain the desired amount of reaction of the cellulose, caustic and etherifying agent (hereinafter "incremental amount").

The cellulose and caustic solution are thoroughly mixed to uniformly distribute the caustic solution throughout the cellulose. Such blending may be performed in the reactor or as a pre-treatment step prior to charging the reactor with the reaction mass.

To minimize degradation of the cellulose, the alkylene oxide and etherifying agent reactions are advantageously performed in the substantial absence of air or oxygen.

In both the one- and two-stage embodiments of this invention, the reactor containing the reaction mass comprising the cellulose and caustic is heated to a temperature such that the cellulose can react with the alkylene oxide and the etherifying agent. In general, the reaction mass is heated to a temperature of about 40° to about 140° C., preferably about 40° to about 120° C., more preferably 75° to about 95° C. Higher temperatures are generally undesirable due to increased degradation of the cellulose. At lower temperatures, the etherification reactions generally do not proceed at a commercially acceptable rate.

In the one-stage embodiment of this invention, the alkylene oxide is continuously added to the heated reaction mass under conditions such that the propylene oxide reacts with the cellulose to attach hydroxyalkoxyl substituents thereto. The amount of AO employed will vary somewhat according to the amount of hydroxyalkoxy substitution desirably attached to the cellulose. In general, from about 0.4 to about 8, preferably about 0.4 to 5, moles of the AO are employed per mole of cellulose pulp. The rate of addition of AO to the reactor is most advantageously approximately equal to the rate of reaction thereof so that at no time during the reaction are there large quantities of unreacted AO present in the reaction vessel. Since the rate of the AO reaction varies somewhat with temperature, the rate of AO addition will generally vary with temperature as well. Typically, the AO is added to the vessel over a 10–60 minute period. The addition of the AO is preferably performed continuously over such period but may be done as a series of additions of small portions of the total amount of AO to be loaded. As used herein the term "continuously" is used to include both continuous addition and the addition of a reactant as a series of additions of small portions of the total amount of that reactant to be loaded. The addition of AO is done under conditions such that hydroxyalkoxyl groups become attached to the cellulose. In particular, the temperature in the reactor is maintained within the aforementioned ranges.

The AO employed herein is a $C_3$ or higher unsubstituted or inertly substituted alkylene oxide. Preferably, the alkylene oxide is linear and unsubstituted. More preferably, the alkylene oxide is propylene oxide or butylene oxide. By "inertly substituted" is meant that the AO contains no functional groups which interfere with the hydroxyalkylation or etherification reactions.

In the one-stage embodiment of this invention, the etherifying agent is also added continuously to the heated reaction mass under conditions such that ether groups become attached to the cellulose. The addition of etherifying agent may be done concurrently with or after the alkylene oxide addition. Again, the rate of addition of the etherifying agent is advantageously approximately equal to the rate of reaction thereof so that at no time are there large amounts of unreacted etherifying agent present in the reactor. Typically, the etherifying agent is added over a 0.5–20 hour period. As with the AO addition, the addition of the etherifying agent may be performed continuously or as a series of additions of small portions of the total amount of etherifying agent to be added. The temperature in the reaction vessel during such addition is maintained within the aforementioned ranges.

The etherifying agent employed herein is any suitable reagent other than an alkylene oxide which reacts with cellulose under alkaline conditions to attach ether substituents thereto. Commonly employed etherifying agents include carboxyalkylating agent and alkylating agents. Typical carboxyalkylating agents include haloaliphatic carboxylic acids such as chloroacetic acid. Alkylating agents include the alkyl halides and dialkyl sulfates, especially the $C_1$–$C_{12}$ alkyl halides and $C_1$–$C_{12}$ dialkyl sulfates. Preferably, the alkyl group contains no more than four carbon atoms, and more preferably it is either methyl or ethyl. Most preferably, the alkylating agent is methyl chloride or ethyl chloride. The amount of etherifying agent employed depends somewhat on the amount of alkoxy substitution desired on the product. However, in general, from about 1 to about 8, preferably from about 1.3 to about 6, more preferably from about 2 to about 4, moles of etherifying agent are employed per mole of cellulose. Mixtures of two or more of the aforementioned etherifying agents may, of course, be employed.

In the two-stage embodiment of the invention, to the reaction mass is first continuously added the AO under the conditions described hereinbefore with the exception that the reaction mass contains only enough caustic to break up the crystallinity of the cellulose. After the AO addition is complete, an incremental amount of caustic solution is added to the reaction vessel. This "incremental amount" of caustic solution is sufficient to catalyze the subsequent reaction of the cellulose with the etherifying agent so that the desired amount of ether groups becomes attached to the cellulose. In general from about 0.3 to 2.0, preferably 0.35 to 1.0, parts of caustic are employed per part by weight of cellulose pulp. A larger incremental amount of caustic will generally result in a higher amount of ether substitution on the cellulose. The addition of this incremental amount of caustic solution is done with agitation to uniformly disperse the caustic solution throughout the reaction mass. This incremental amount of caustic may be added to the reaction mass while the reaction mass is at reaction temperatures. Alternatively, the reaction mass may be cooled below reaction temperatures (i.e., below 40° C.) for the addition of the incremental amount of caustic.

Preferably, in the two-stage reaction following the addition of AO, and prior to the addition of the incremental amount of caustic solution, the reactor is maintained at the reaction temperature for a short period to allow the hydroxypropoxyl reaction to be completed. Typically, a period of 15 minutes to 2 hours, preferably about 15 minutes to 45 minutes, is desirable.

Following th addition of the incremental amount of caustic solution in the two-stage reaction, the etherifying agent is continuously added to the reactor. This addition, like the AO addition, is conducted under conditions such that the etherifying agent reacts with the cellulose to attach a desired amount of ether substituents thereto. The general conditions of the addition of the etherifying agent are as described hereinbefore.

Following the addition of all reagents in either the one- or two-stage process, the reaction vessel is advantageously and preferably maintained at the reaction temperature for a short, i.e., 15 minute to 2 hour period, to permit the alkylation reactions to be completed. Following completion of the alkylation reactions, the product is recovered, purified, ground or packaged as desired in conventional manner. Purification is typically effected by simple washing with water at a temperature above the gel point of the product to remove salts therefrom. The product may be ground, if desired, using conventional grinding apparatus such as a ball mill. Granulated products may also be prepared from the recovered product in conventional manner. The product may be crosslinked with glyoxal or other dialdehyde.

It has been found that in the practice of this invention, dramatic improvements in the efficiency of the AO reaction with cellulose are achieved. In contrast with the AO efficiencies in the range of 10 to 30 percent as achieved in the prior art, AO efficiencies achieved with the present invention are usually at least 25 percent and often in excess of 40 percent. In the two-stage embodiments of this invention, AO efficiencies as high as about 45 to 60 percent or more are often achieved. In addition, the total time required to prepare hydroxyalkylalkylcellulose ether is significantly reduced with the practice of this invention. Reductions of 10 to 50 percent in reaction time are often seen with the practice of this invention. Significantly, despite the increased reaction efficiencies and reduced cycle times, the quality of the product prepared by this process is substantially equivalent to that of products made in conventional manner.

The products made by the process of this invention may be employed in all applications in which conventionally prepared cellulose ethers are employed. For example, these cellulose ethers may be employed as thickeners in latex paints, emulsion stabilizers, protective colloids, water retention aids, adhesives, matrices for sustained pharmaceutical compositions and the like.

The following examples are provided to illustrate the invention but not to limit the scope thereof. All parts and percentages are by weight unless otherwise indicated.

EXAMPLE 1—ONE-STAGE REACTION

Into a continuously agitated reaction is loaded 20 pounds of ground cotton linters. The head space of the reactor is evacuated and flooded with nitrogen. To the reaction vessel is sprayed 26.0 pounds of a 50 weight percent sodium hydroxide solution with sufficient agitation to thoroughly distribute the sodium hydroxide through the cotton linters.

The reactor is then heated to about 85° C. and 20 pounds of propylene oxide are continuously added to the reactor over a 45-minute period. Following the propylene oxide addition, the reactor is maintained at about 85° C. for 45 minutes and then 22 pounds of methyl chloride are added over a 60-minute period. Following the methyl chloride addition, the reactor is maintained at about 85° C. for an additional 2 hours and the product is recovered. The properties of the product are as reported as Sample No. 1 in Table I following.

EXAMPLE 2—TWO-STAGE REACTION

Into a continuously agitated reactor is loaded 30 pounds of ground cotton linters. The head space of the reactor is evacuated and flooded with nitrogen. To the reaction vessel is sprayed 18 pounds of a 50 weight percent sodium hydroxide solution with sufficient agitation to thoroughly distribute the sodium hydroxide through the cotton linters. The reactor is heated to 85° C. and, over a 15-minute period is then continuously added 7.5 pounds of propylene oxide. Following the propylene oxide addition, the reaction vessel is maintained at about 90° C. for 30 minutes and then 48 pounds of a 50 weight percent sodium hydroxide solution is added. Following the short period of mixing, 51 pounds of methyl chloride is added continually over a 30-minute period while maintaining the temperature in the reaction vessel at about 80° to 90° C. Following the methyl chloride addition, the reaction is maintained at about 90° C. for a period of 0.5 hour and the product is recovered. The properties of this product are as reported as Sample No. 2 in Table I following.

For comparison, the foregoing process is repeated except that instead of continuously adding the AO and methylene chloride, all of the AO is added at once in the first stage and all of the methyl chloride is added at once in the second stage of the reaction. The properties of the resulting are as described as Sample No. C-1 in Table I.

Also for comparison, a hydroxypropylmethylcellulose is prepared using substantially the same reactant ratios as employed in preparing Sample No. 2. This time, however, a conventional one-stage etherification process with no continuous addition of reagent is used. The properties of the resultant HPMC are as reported as Sample No. C-2 in Table I.

TABLE I

| Sample No. | % MeO[1] | % HP[2] | % Solids[3] | MeCl Ratio[4] | AO Ratio[5] | MeCl Efficiency[6] | AO Efficiency[7] |
| --- | --- | --- | --- | --- | --- | --- | --- |
| 1 | 17.0 | 24.8 | 0.3 | 1.1 | 1.0 | 37.8 | 26.2 |
| C-1* | 17.4 | 18.5 | 0.3 | 1.0 | 0.95 | 38.2 | 19.3 |
| 2 | 28.0 | 12.3 | 0.6 | 1.7 | 0.25 | 42.1 | 49.0 |

TABLE I-continued

| Sample No. | % MeO[1] | % HP[2] | % Solids[3] | MeCl Ratio[4] | AO Ratio[5] | MeCl Efficiency[6] | AO Efficiency[7] |
|---|---|---|---|---|---|---|---|
| C-2* | 28.8 | 8.8 | 2.1 | 1.4 | 0.2 | 41.8 | 42.6 |

*Not an example of the invention.
[1]Methoxyl substitution on the HPMC, expressed as a percentage of the total weight of the HPMC.
[2]Hydroxypropoxyl substitution on the HPMC, expressed as a percentage of the total weight of the HPMC.
[3]Percentage, in weight, of the HPMC which is insoluble in water.
[4]Weight ratio of methyl chloride to cellulose pulp employed in the preparation of the sample.
[5]Weight ratio of AO to cellulose pulp employed in the preparation of the sample.
[6]The percentage of methyl chloride consumed in the reaction which reacted to form methoxyl groups on the cellulose.
[7]The percentage of propylene oxide consumed in the reaction which reacted to form methoxyl groups on the cellulose.

As can be seen from the foregoing table, significant increases in methylene chloride efficiency and AO efficiency are achieved when Sample No. 1 is compared with Comparative Sample No. C-1 and Sample No. 2 is compared with Comparative Sample No. C-2. In addition, the hydroxypropoxyl substitution on the products of the process of this invention are higher than those of the corresponding comparative samples. Thus, it is seen that, using the process of this invention, equivalent hydroxypropoxyl substitution can be achieved with smaller amounts of the alkylene oxide.

What is claimed is:

1. The process for preparinq mixed hydroxyalkylcellulose ethers containing $C_3$ or higher hydroxyalkoxyl substituents, said process comprising the steps of (a) forming a reaction mass comprising cellulose and an amount of an alkali metal hydroxide at least sufficient to break up the crystallinity of the cellulose and to catalyze a reaction between cellulose and an alkylene oxide and (b) continuously adding a $C_3$ or higher alkylene oxide and an etherifying agent other than an alkylene oxide to the reaction mass under conditions including an elevated temperature such that the alkylene oxide and the etherifying agent react with the cellulose to attach ether groups thereto.

2. The process of claim 1 wherein the temperature is in the range from about 40°–120° C.

3. The process of claim 1 wherein the alkylene oxide is propylene oxide.

4. The process of claim 1 wherein the etherifying agent is a haloaliphatic carboxylic acid, an alkyl halide or a dialkyl sulfate.

5. The process of claim 4 wherein the etherifying agent is chloroacetic acid or methyl chloride.

6. The process of claim 1 wherein the etherifying agent is added to the reaction mass after the addition of the alkylene oxide is completed.

7. A process for preparing mixed hydroxyalkylcellulose ethers, said process comprising the steps of (a) forming a reaction mass comprising cellulose and an amount of an alkali metal hydroxide not substantially in excess of that amount required to break up the crystallinity of the cellulose, (b) continuously adding to the reaction mass a $C_3$ or higher alkylene oxide under conditions including an elevated temperature such that a desired amount of hydroxyalkoxy groups become attached to the cellulose, then (c) adding an incremental amount of an alkali metal hydroxide to the reaction mass and then (d) continuously adding an etherifying agent which is not an alkylene oxide to the reaction mass under conditions including an elevated temperature such that a desired amount of ether groups become attached to the cellulose.

8. The process of claim 7 wherein steps (b), (c) and (d) are carried out at a temperature in the range from about 40° to 120° C.

9. The process of claim 8 wherein following the addition of alkylene oxide in step (b), the reaction mixture containing the cellulose pulp, the alkali metal hydroxide and alkylene oxide is maintained at a temperature of 40° to 120° C. from about 15 minutes to 2 hours prior to the addition of said incremental amount of alkali metal hydroxide.

10. The process of claim 9 wherein following the addition of the etherifying agent in step (d), the reaction mixture is maintained at a temperature of about 40° to about 120° C. for a period of 15 minutes to 2 hours.

11. The process of claim 8 wherein from about 0.15 to 0.5 part of sodium hydroxide per part by weight of cellulose is employed in step (a) and from about 0.35 to about 1.0 part of sodium hydroxide is employed per part by weight of cellulose in step (c).

12. The process of claim 8 wherein the alkylene oxide is propylene oxide wherein from about 0.4 to about 5 moles of propylene oxide are employed per mole of cellulose.

13. The process of claim 12 wherein the etherifying agent is methyl chloride wherein from about 2 to about 4 moles of methyl chloride are employed per mole of cellulose.

* * * * *